United States Patent [19]

Bacconnet et al.

[11] Patent Number: 5,098,639

[45] Date of Patent: Mar. 24, 1992

[54] FISSION CHAMBER WITH A WIDE MEASURING RANGE AND APPARATUS FOR MEASURING THE NEUTRON FLUX DENSITY USING SAID FISSION CHAMBER

[75] Inventors: Eugène Bacconnet, Marcoussis; Gérard Dauphin, Elancourt, both of France

[73] Assignee: Commissariat L'Energie Atomique, Paris, France

[21] Appl. No.: 707,602

[22] Filed: May 30, 1991

[30] Foreign Application Priority Data

Jun. 5, 1990 [FR] France .................. 90 06929

[51] Int. Cl.⁵ ........................................ G21G 1/06
[52] U.S. Cl. .................................. 376/154; 376/153
[58] Field of Search ............... 376/153, 154, 155; 250/390.01

[56] References Cited

U.S. PATENT DOCUMENTS

| | | | |
|---|---|---|---|
| 2,809,313 | 10/1957 | Baer et al. | 313/61 |
| 3,385,988 | 5/1968 | Hyun | 313/61 |
| 4,071,764 | 1/1978 | Thurlow, II | 250/390 |
| 4,495,144 | 1/1985 | Lingren et al. | 376/255 |
| 4,682,036 | 7/1987 | Wakayama et al. | 250/374 |

FOREIGN PATENT DOCUMENTS

3437104 5/1985 Fed. Rep. of Germany .
2357915 2/1978 France .

Primary Examiner—Brooks H. Hunt
Assistant Examiner—Chrisman D. Carroll
Attorney, Agent, or Firm—Pearne, Gordon, McCoy & Granger

[57] ABSTRACT

Fission chamber with a wide measuring range and apparatus for measuring the neutron flux density using said fission chamber. The chamber comprises an enclosure (2) filled with a gaseous medium and, in the latter, electrodes (8,10) adjacent the periphery of the enclosure, whereof at least one is covered with a fissile material having a large surface density or mass, as well as other electrodes (10,12) adjacent the center of the enclosure, whereof, at least one is covered with a fissile material having a smaller surface density, chosen so as to optimize (a) the ratio of the electric currents respectively due to the neutrons and to spurious gamma radiation detected by the other electrodes and (b) the linearity of the signal supplied by the latter for a given flux density range.

13 Claims, 4 Drawing Sheets

FISSION CHAMBER WITH A WIDE MEASURING RANGE AND APPARATUS FOR MEASURING THE NEUTRON FLUX DENSITY USING SAID FISSION CHAMBER

The present invention relates to a fission chamber with a wide measuring range, as well as to an apparatus for measuring the neutron flux density using said fission chamber.

The invention makes it possible to measure neutron flux densities from 1 to $10^{12}$ neutrons·cm$^{-2}$·s$^{-1}$ (12 decades).

It more particularly applies to the inspection and control of a nuclear reactor, as well as to the production of safety chains to be used close to such a reactor if it is subject to an accident.

It is pointed out that a fission chamber is a neutron detector comprising an ionization chamber and in which use is made of the fission reactions of a fissile material, e.g. uranium 235, which is irradiated by slow neutrons.

The fission fragments of said material have in each case a high energy (65 and 102 MeV for fission fragments of a uranium 235 atom) and lose this energy by ionizing the gas of the ionization chamber.

The electrical charges created by the fission fragments are collected by an electric field established between electrodes with which the chamber is provided, each fission giving rise to a current pulse.

It is known to transform said current pulse into a voltage pulse by using appropriate electronic means. It is also possible to obtain and measure an average d.c. current by the summation of a large number of pulses.

A known fission chamber comprises an enclosure, which can be cylindrical and which is filled with an appropriate gas, as well as two electrodes placed in the enclosure and which are electrically insulated from one another and separated from one another by a distance generally corresponding to the average free passage of the fission fragments in the gas in question.

The two electrodes are either cylindrical and coaxial, or planar, then being plates. The respective faces of the two electrodes, which are positioned facing one another, are covered with a thin deposit of a fissile material in order to enable the fission fragments to pass out of said deposit. Generally use is made of a uranium 235 deposit, which has a surface mass or density equal to or below 2 mg·cm$^{-2}$.

The monitoring and control of a pressurized water nuclear reactor makes it necessary to measure neutron flux densities between 1 and $10^{11}$ neutrons·cm$^{-2}$·s$^{-1}$, i.e. 11 decades.

It is known to cover such a measuring range by using three different measuring chains, respectively comprising three different detectors, namely a source chain equipped with proportional counters operating in the pulse mode, a so-called "intermediate" chain equipped with boron ionization chambers and which are compensated with respect to the gamma radiation and a power chain equipped with uncompensated boron ionization chambers.

Consideration has already been given to covering a large measuring range by means of a single detector, namely the aforementioned fission chamber operating in accordance with three different signal analysis modes, namely the pulse mode, the fluctuation mode and the current mode.

With regards to the pulse mode, each fission occurring within the ionization chamber gives rise to an electric pulse. All the pulses are counted and analysed by so-called pulse electronic means comprising an amplifier, an amplitude discriminator and an integrator. The measuring range for this operating mode is 1 to $10^6$ counts per second.

With regards to the fluctuation mode, when the number of fissions per second, within the fission chamber, is sufficiently high (above $10^4$ fissions per second), said fissions induce an average current. The analysis of the fluctuations of this current and more specifically the spectral power density in a given range of the frequency spectrum is a function of the number of pulses produced by the current, which makes it possible to measure a neutron flux density in a range equivalent to that between $10^4$ and $10^9$ counts per second.

In the case of the current mode, measurement takes place of the average current supplied by the chamber when said current reaches an acceptable value and the spurious currents due to the alpha radiation of the uranium of the chamber and the ambient gamma radiation are negligible compared with the current due to the fissions and therefore the neutrons. It is therefore possible to measure a neutron flux density from $10^8$ to $10^{12}$ neutrons·cm$^{-2}$·s$^{-1}$.

However, the total measuring range (9 to 10 decades) which can be reached with a conventional fission chamber, operating according to the three aforementioned modes, is somewhat too limited to make it possible to inspect and control a nuclear reactor under good conditions. On assisting the sensitivity to low neutron flux densities, there is a deterioration to the linearity at high flux densities.

The known solutions for covering a large measuring range are consequently that described hereinbefore consisting of using three measuring chains respectively associated with three separate detectors which is complicated and the other aforementioned solution consisting of using a conventional fission chamber operating according to the pulse, fluctuation and current modes.

The second solution leads to a slightly short measuring range and it is then necessary to add to the chain operating according to these three modes a supplementary measuring chain, either on the low flux density side, or on the high flux density side, so once again the solution is complicated.

A variant of the second solution consists of using a conventional fission chamber, which is compensated with respect to alpha and gamma radiation in the manner disclosed in FR-A-2357915.

This makes it possible to avoid the use of the fluctuation mode, but does not make it possible to increase the total measuring range of a conventional fission chamber.

SUMMARY OF THE INVENTION

The object of the present invention is to obviate the said deficiencies and to propose a fission chamber making it possible to cover a measuring range extending over 12 decades. It is then possible to produce a measuring chain covering these 12 decades (from 1 to $10^{12}$ neutrons·cm$^{-2}$·s$^{-1}$) using only a single detector (namely the fission chamber according to the invention).

Specifically, the present invention relates to a fission chamber with a wide measuring range comprising an enclosure filled with a gaseous medium and, in the said enclosure, a plurality of electrodes covered with a fissile material, said chamber being characterized in that the electrodes are distributed into two groups, namely:

a first group of electrodes close to the periphery of the enclosure, at least one electrode of said first group being covered with a first deposit of fissile material having a large surface density and a second group of electrodes close to the centre of the enclosure and therefore exposed to a lower neutron flux density than that to which are exposed the electrodes of the first group, at least one electrode of the second group being covered with a second deposit of fissile material, whose surface density is below that of the first deposit and chosen in such a way as on the one hand to make as large as possible the ratio of the currents respectively due to neutrons and spurious gamma radiation and which can be detected via electrodes of the second group and on the other hand, optimizing the linearity of the signal supplied by the electrodes of said second group for a given neutron flux density range.

The fissile material used can be enriched uranium, e.g. 93% uranium 235.

To ensure a minimum charge collection time when the chamber according to the invention functions in the pulse mode, preference is given to the use of a gaseous medium constituted by a mixture of gases, e.g. argon to which has been added 4% nitrogen.

It should be noted that the fission chamber according to the invention has two groups of electrodes, each electrode group corresponding to an exploitable electric signal output.

In the case of the present invention, in order to obtain neutron flux density measurements in a nuclear reactor, it is consequently sufficient to establish two electrical connections through a tight wall between the fission chamber, located in the vicinity of the reactor core, and electronic signal processing means positioned outside the reactor confinement enclosure.

The surface density of the first fissile material deposit can be between 1 and 2 mg·cm$^{-2}$. The surface density of the second fissile material deposit can be between 0.01 and 1 mg·cm$^{-2}$, but is preferably between 0.1 and 1 mg·cm$^{-2}$.

According to a special embodiment of the chamber according to the invention, each group of electrodes comprises two electrodes, whereof one is earthed or grounded and is common to both groups.

According to another particular embodiment, the first group of electrodes comprises at least three electrodes connected in parallel, so that the first electrode group intended for operation in the pulse and fluctuation modes or optionally in the current mode, has a high sensitivity to thermal neutrons.

The second group of electrodes can have at least two electrodes connected in parallel.

According to a preferred embodiment of the chamber according to the invention, in order to utilize a simple and easily performable technology, the electrodes of the first and second groups are cylindrical and coaxial. Preferably, the electrodes of the first and second groups are supported, at each end, by electrically insulating supports. This makes it possible to increase the stability of the ionization chamber, particularly so that it can continue to operate following an accident to the reactor in which it has been placed.

In a preferred embodiment of the fission chamber according to the invention, the latter also has two inter-electrode guard rings. This makes it possible to obtain a good operating linearity in the current mode, in which each group of electrodes is able to operate.

The present invention also relates to an apparatus for measuring the neutron flux density and comprising a fission chamber, means for polarizing the chamber electrodes and electronic processing means for the electric signals supplied by said chamber and which determine the neutron flux density, said apparatus being characterized in that the fission chamber is in accordance with the present invention.

According to a first special embodiment of the apparatus according to the invention, the electronic processing means comprise means for measuring the neutron flux density able to operate in the pulse mode and associated with the first group of electrodes, means for measuring the neutron flux density able to operate using the fluctuation signal of the current supplied by the detector and which are associated with the first group of electrodes and means for measuring the neutron flux density able to operate in the current mode and associated with the second group of electrodes.

According to a second embodiment of the apparatus according to the invention, the electronic processing means comprise first neutron flux density measuring means able to operater in the pulse mode and associated with the first group of electrodes, second neutron flux density measuring means able to operate in the pulse mode and which are associated with the second group of electrodes and which serve to measure neutron flux densities above those measured with the aid of the first means, third neutron flux density measuring means able to operate in the current mode and which are associated with the first group of electrodes and measure neutron flux densities above those measured with the aid of the second means and fourth neutron flux density measuring means able to operate in the current mode and associated with the second group of electrodes and which measure flux densities above those measured with the aid of the third means.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENT

Figure 1:
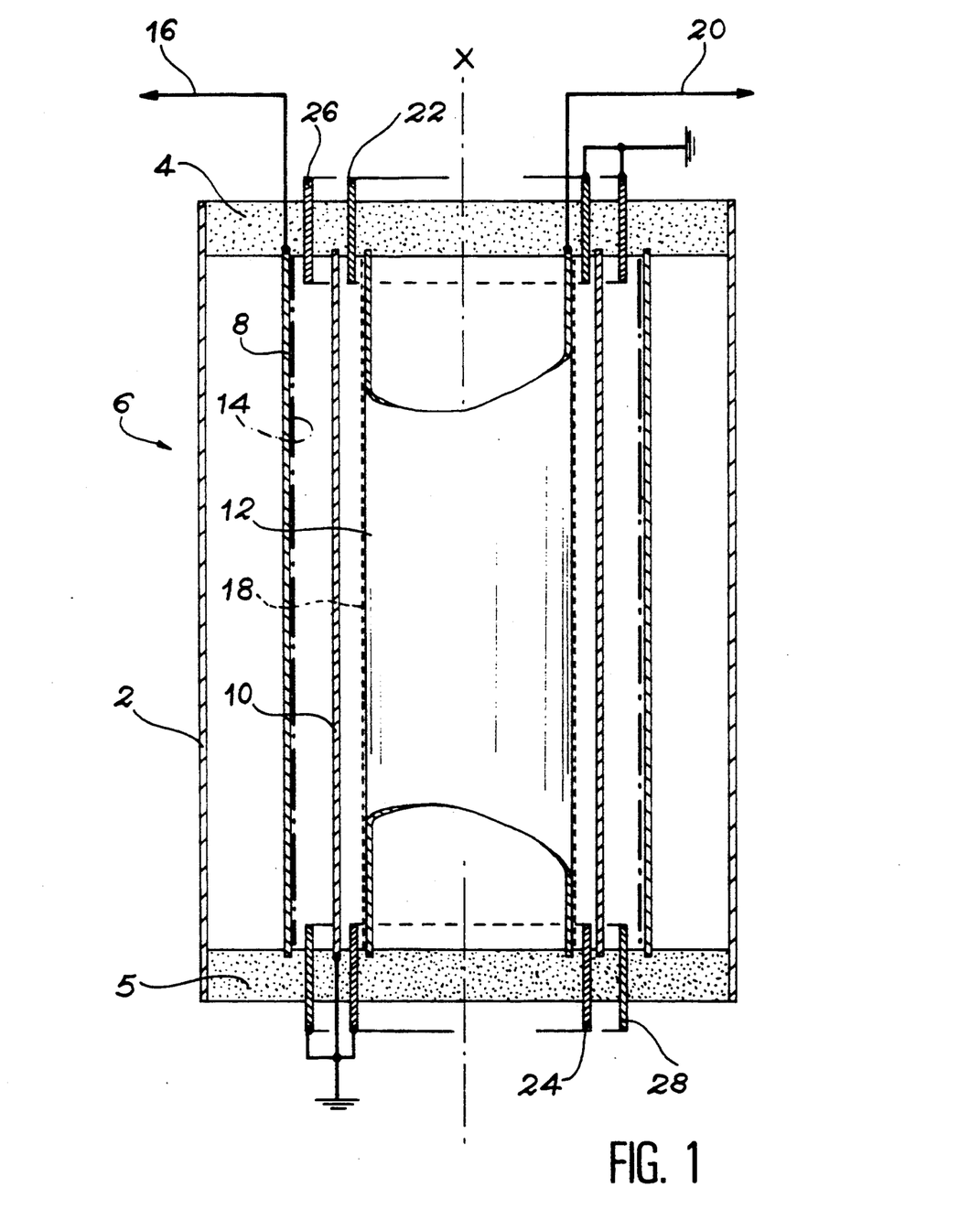
FIG. 1 a diagrammatic sectional view of an embodiment of the fission chamber according to the invention.

The special embodiment of the fission chamber according to the invention diagrammatically shown in FIG. 1 has a tight enclosure 2, which e.g. adopts the shape of a cylinder of revolution of axis X and which is closed at its two ends by electrically insulating closing plates 4 and 5.

In a not shown, more practical embodiment, the closing plates are metallic and have insulating supports for the electrodes and tight insulating passages for the electric signal outputs.

The enclosure 2 is filled with an appropriate gaseous mixture ionizable by fission products resulting from the disintegration of a fissile material contained in the chamber and which will be described hereinafter.

The fission chamber 6 shown in FIG. 1 also has, in the enclosure 2, a first group of cylindrical, coaxial electrodes 8 and 10 and a second group of cylindrical, coaxial electrodes 10 and 12, the electrode 10 thus being common to the two groups. The electrodes 8, 10 and 12 are coaxial and have as the common axis the axis X.

The electrodes of the first group are closer to the periphery of the enclosure 2, whilst the electrodes of the second group are closer to the axis X of the enclosure 2, the electrode 10 being located between the electrodes 8 and 12. The electrode 8 is spaced from the wall of the enclosure 2 and the electrodes 8, 10 and 12 are spaced and electrically inuslated from one another.

The ends of each of the electrodes 8, 10 and 12 are respectively supported by plates 4 and 5. The face of the electrode 8, which faces the electrode 10, is covered with a fissile material deposit 14 having a high surface mass or density. The face of the electrode 10, which faces the electrode 8 can also be covered with a deposit identical to deposit 14.

During the use of the fission chamber 6, one of the electrodes of the first group, e.g. the electrode 8, is connected to not shown, electronic measuring means associated with said first group via a tight passage made in one of the plates 4 and 5 (plate 4 in the case of FIG. 1) and vialan electric cable 16, whose characteristic impedance is 50 ohms and whose losses are low, whilst the other electrode of the first group, in the present case electrode 10, is grounded.

When the ionization chamber 6 is placed in a neutron flux density (e.g. that produced in the core of a nuclear reactor), the second group of electrodes, which is closer to the axis X than the first group, is exposed to a lower neutron flux density than that to which the electrodes of the first group are exposed.

The face of the electrode 12, which faces the electrode 10, is covered with a fissile material deposit 18, whose surface density is lower than that of the deposit 14 relative to the first group of electrodes.

In other words, using the same fissile material for both electrode groups, the thickness of the deposit 18 is smaller than that of the deposit 14.

Moreover, the choice of the surface density of the deposit relative to the second group of electrodes results from a compromise. The said surface density is chosen so as to make as large as possible the ratio (neutron I)/(gamma I) of the electrical current due to neutrons to the electrical current due to the gamma radiation, said currents being detectable by the electrodes of the second group, e.g. when the fission chamber 6 is placed in the vicinity of a nuclear reactor core and optimize the linearity of the electrical signal supplied by the second group electrodes for a given neutron flux density range, i.e. in the case where the fission chamber is placed in the vicinity of a nuclear reactor core, for a nominal power reactor operation.

The face of the electrode 10 which faces the electrode 12 can also be covered with a deposit identical to the deposit 18.

The second group of electrodes can operate in the current mode and optionally in the pulse mode.

During the use of the fission chamber 6, the electrode 12 is connected to not shown, electronic measuring means associated with the second electrode group across a tight passage formed in one of the insulating plates 4 and 5 (plate 4 in the example of FIG. 1) and via an electric cable 20.

In the case of a current mode operation, it is sufficient for the electric cable 20 to give a good protection against interference. When an operation in the pulse mode is also envisaged, the electric cable 20 should have a fixed impedance for the transfer of pulses.

In an informative and non-limitative manner the enclosure 2 is made from aluminium or stainless steel, the plates 4 and 5 from alumina or metal with passages and insulating supports of alumina, the gaseous mixture is constituted by argon to which is added 4% nitrogen, the fissile material (material able to give rise to fission reactions when irradiated by slow neutrons) is 93% enriched uranium 235, the surface density of the deposit relative to the first electrode group is approximately 1 to 2 mg·cm$^{-2}$ and the surface density of the deposit relative to the second electrode group is approximately 0.01 to 1 mg·cm$^{-2}$ or preferably approximately 0.1 to 1 mg/cm$^{-2}$.

As the two electrode groups are liable to operate in the current mode, the ends of these electrodes are preferably equipped with conventional guard rings, so as to unambiguously fix the shape and value of the interelectrode electrical field, eliminate interelectrode electrical losses and therefore obtain a good linearity for the current operating mode.

In the embodiment shown in FIG. 1, there are two identical guard rings 22, 24, whose common axis is the axis X, which traverse respectively the insulating plates 4 and 5, which are respectively located between the ends of the electrodes 10 and 12 (and separated therefrom) and which are grounded.

It is also possible to see two other identical guard rings 26, 28, whose common axis is the axis X, which respectively traverse the insulating plates 4 and 5, which are located between the ends of the electrodes 8 and 10 (and separated therefrom) and which are also grounded.

The first electrode group can have more than two electrodes covered on the facing faces by a fissile material deposit having a high surface density, in order to have a high sensitivity to thermal neutrons. These electrodes are connected in parallel. In the first group, the electrodes connected to the electronic measuring means associated with said first group alternate with grounded electrodes.

In the same way, if necessary, the second electrode group can comprise two or more electrodes covered on one or both facing faces with a fissile material deposit, whose surface density is chosen in the manner described hereinbefore.

In the second group, all the second electrodes are also connected in parallel. Electrodes connected to the electronic measuring means associated with the second group alternate with grounded electrodes.

Figure 2:
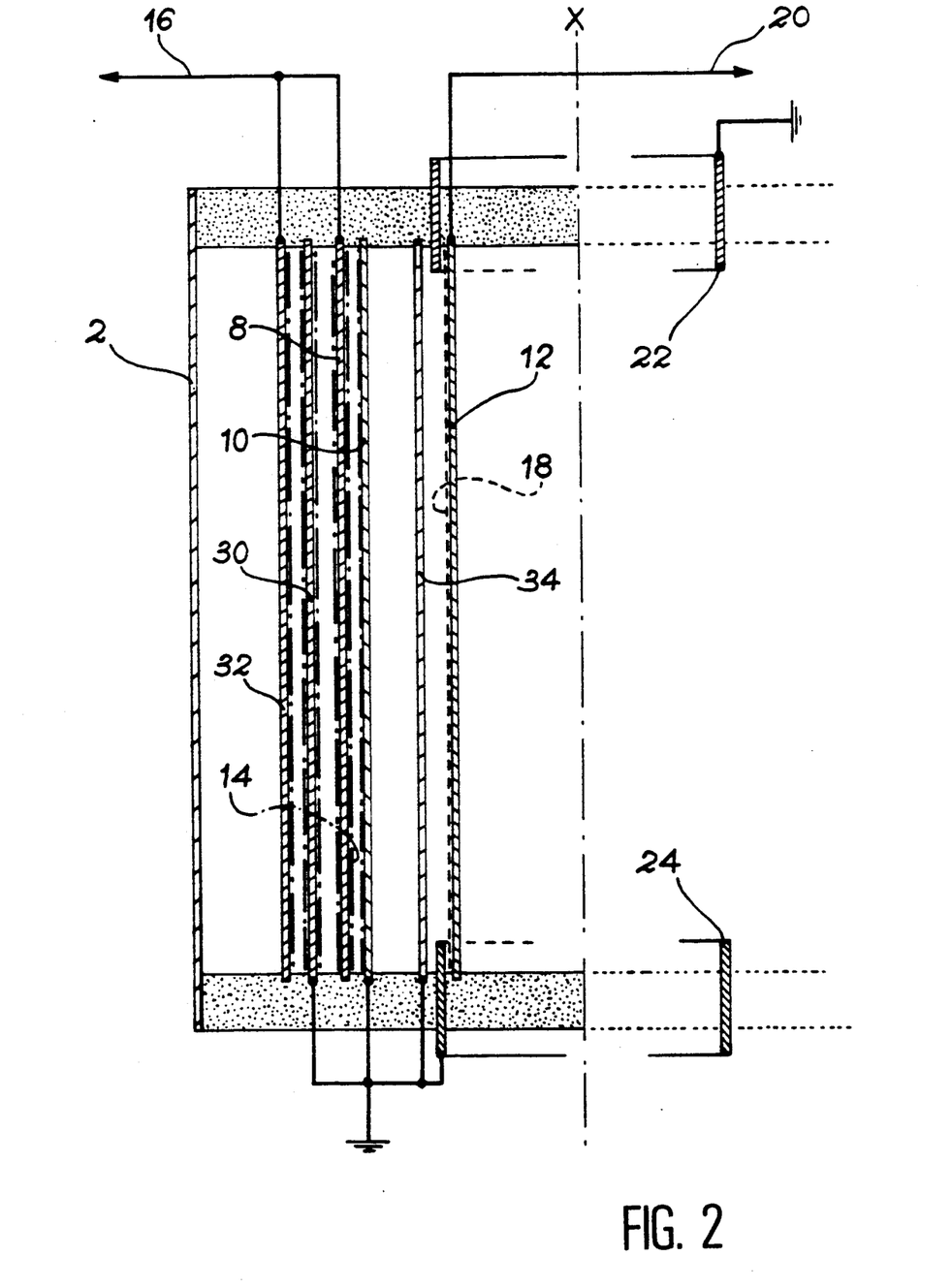
FIG. 2 a partial, diagrammatic sectional view of another embodiment of said chamber.

All this is illustrated in FIG. 2 in which the fission chamber 6 of FIG. 1 has been modified. It is possible to see a first group of cylindrical and coaxial electrodes comprising electrodes 8 and 10 and also electrodes 30 and 32 between the enclosure wall and the electrode 8, electrode 32 being closest to the said wall.

The faces of the electrodes 30 and 32, which are turned towards the common axis X to the electrodes 8, 10, 30 and 32, as well as the faces of the electrodes 8,10 and 30 turned towards the outside, carry a fissile material deposit identical to the deposit 14. The electrodes 8 and 32 are connected to the cable 16 and the electrodes 10 and 30 are grounded.

In the embodiment shown in FIG. 2, the second electrode group comprises the electrode 12 and an electrode 34 between the electrodes 10 and 12. All the electrodes are cylindrical and coaxial and their axis is the axis X. The electrode 12 is connected to the cable 20 and the electrode 34 is grounded. Use is once again made of earthed or grounded guard rings 22 and 24, which are located between the electrodes 12 and 34.

A description will now be given of two neutron flux density measuring apparatuses using a fission chamber according to the invention, e.g. that shown in FIG. 1. The first apparatus is diagrammatically shown in FIG. 3 and functions according to the pulse, fluctuation and current modes. The second apparatus is diagrammatically illustrated by FIG. 5 and functions according to the pulse and current modes.

As a function of the operating type chosen, it may be necessary to adapt the thicknesses of these fissile material deposits, as well as the number of electrodes and the interelectrode spaces.

Figure 3:
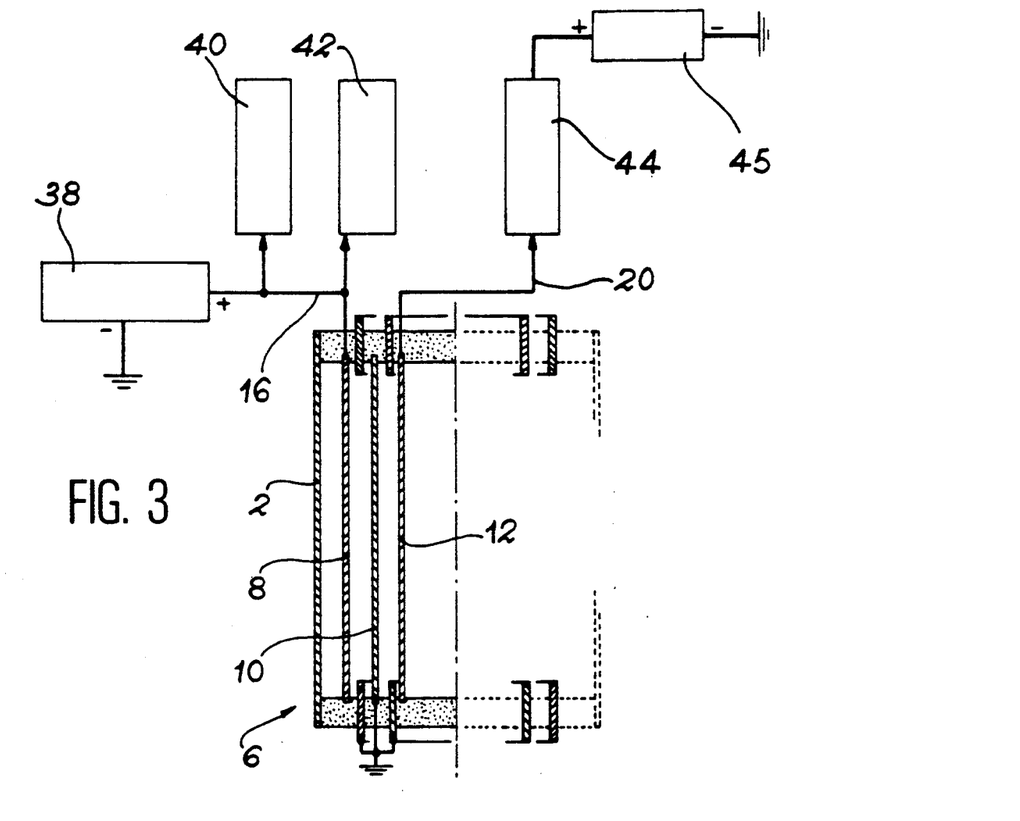
FIG. 3 a diagrammatic view of an apparatus for measuring the neutron flux density comprising the fission chamber shown in FIG. 1.

The apparatus shown in FIG. 3 comprises, apart from the fission chamber 6 of FIG. 1, two high d.c. voltage sources 38 and 45, neutron flux density measuring means 40 functioning in the pulse mode, neutron flux density measuring means 42 functioning in the fluctuation mode and neutron flux density measuring means 44 functioning in the current mode. The means 40, 42 and 44 are equipped with means for displaying the values of the measured neutron flux densities.

Use is made of the first electrode group for pulse and fluctuation mode operation and the second electrode group for current mode operation.

To the cable 16, corresponding to the first electrode group, are connected the means 40 and 42, as well as the positive terminal of the source 38, whose negative terminal is grounded. The means 44 are connected to the cable 20, which corresponds to the second electrode group, and connected in series with the high d.c. voltage source 45, whose negative terminal is grounded. The positive polarization or biasing of the electrode 12 takes place across the means 44 by the high d.c. voltage source.

In a not shown connection variant, in order to economize a high voltage source, the electrode 8 is grounded, the electrode 10 connected via the cable 16 to the source 38 and to the means 40 and 42, whilst the electrode 12 is grounded via means 44.

The user of the apparatus shown in FIG. 3 passes from one mode to the other in accordance with the measured neutron flux density values.

Figure 4:
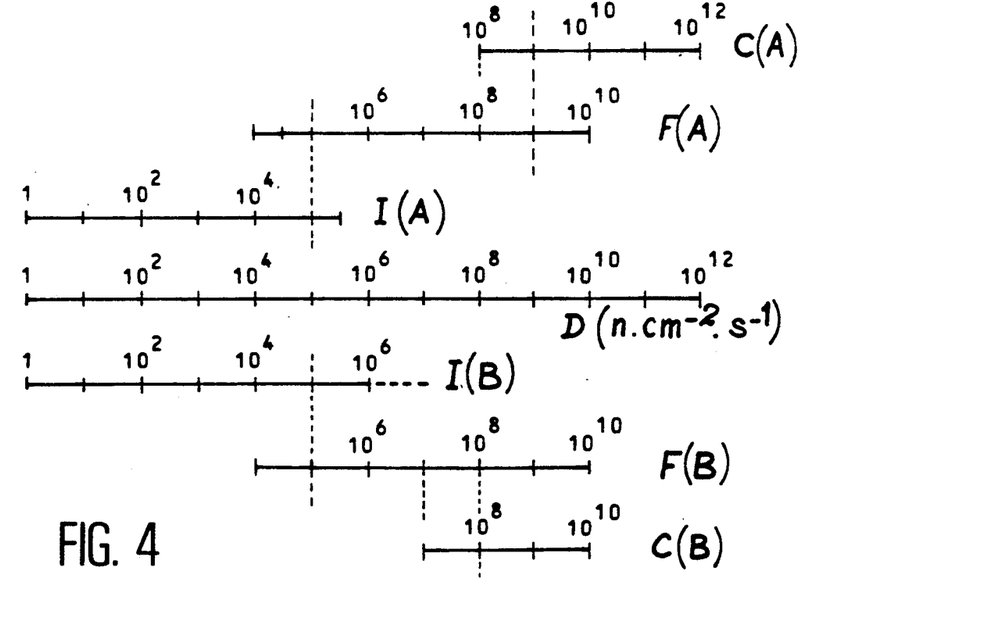
FIG. 4 graphically the operating range of the apparatus of FIG. 3 for comparing it with a known neutron flux density measuring apparatus.
Figure 5:
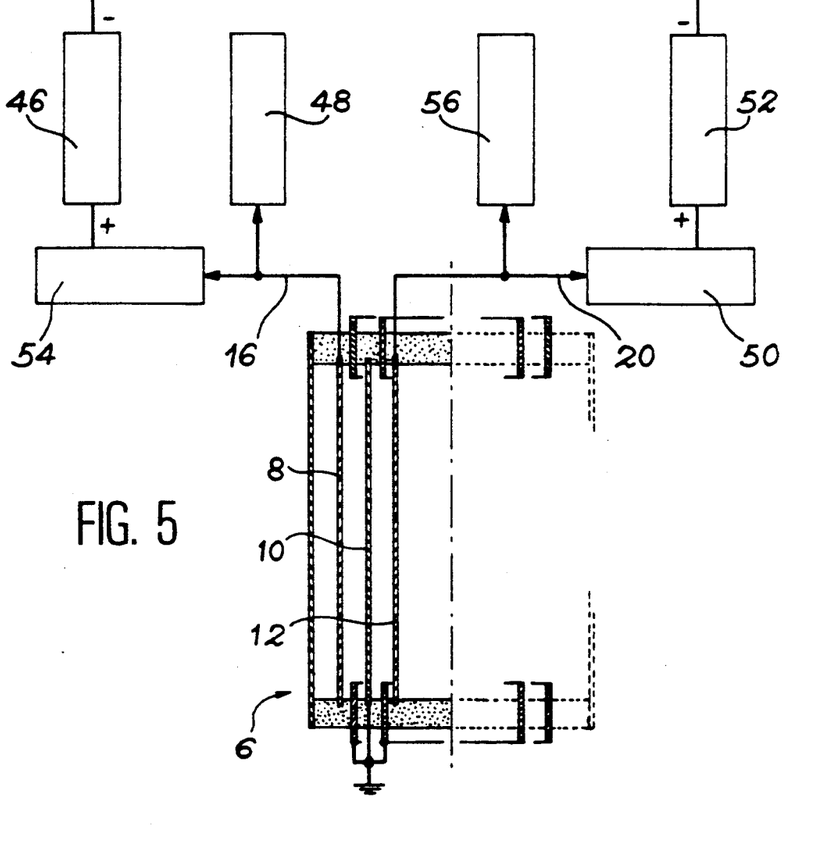
FIG. 5 a diagrammatic view of another neutron flux density measuring apparatus also comprising the fission chamber shown in FIG. 1.

FIG. 4 shows that in order to cover the neutron flux density range D from 1 to $10^{11}$ neutrons·cm$^{-2}$·s$^{-1}$ with the apparatus shown in FIG. 5 (graphs A of FIG. 4), working takes place in the:

pulse mode I from 1 to $10^5$ neutrons·cm$^{-2}$·s$^{-1}$, the fluctuation mode F from $10^5$ to $10^9$ neutrons·cm$^{-2}$·s$^{-1}$ (with the possibility of extending up to $10^{10}$ neutrons·cm$^{-2}$·s$^{-1}$) and the current mode C from $10^9$ to $10^{11}$ neutrons·cm$^{-2}$·s$^{-1}$ (with the possibility of extending up to $10^{12}$ neutrons·cm$^{-2}$·s$^{-1}$).

By comparison, in the case of a conventional CFULO1 fission chamber (graphs B of FIG. 4), working takes place in the pulse mode I from 1 to $10^5$ neutrons·cm$^{-2}$·s$^{-1}$ (with the possibility of extending up to $10^6$ neutrons·cm$^{-2}$·s$^{-1}$), fluctuation mode F from $10^5$ to $10^8$ neutrons·cm$^{-2}$·s$^{-1}$ (with the possibility of extending to $10^{10}$ neutrons·cm$^{-2}$·s$^{-1}$) and current mode C from $10^8$ to $10^{10}$ neutrons·cm$^{-2}$·s$^{-1}$.

The apparatus diagrammatically shown in FIG. 5 comprises, apart from the fission chamber 6 of FIG. 1, a first high d.c. voltage source 46, neutron flux density measuring means operating in the pulse mode 48, neutron flux density measuring means functioning in the current mode 50, a second high d.c. voltage source 52, neutron flux density measuring means operating in the current mode 54 and neutron flux density measuring means operating in the pulse mode 56. The means 48, 50, 54 and 56 are provided with means for displaying the values of the measured neutron flux densities.

To the cable 16, corresponding to the first electrode group of fission chamber 6, are connected the means 48 and 54. The electrode 8 of the fission chamber 6 is positively polarized by the source 46 across the means 54, whilst the negative terminal of the source 46 is grounded. To the cable 20, corresponding to the second electrode group of the fission chamber 6, are connected the means 50 and 56. The electrode 12 of the fission chamber 6 is positively polarized by the source 52 across the means 50, the negative terminal of the source 52 being grounded.

In the case of the apparatus of FIG. 5, consequently each group of electrodes is used for pulse and current mode measurements.

Figure 6:
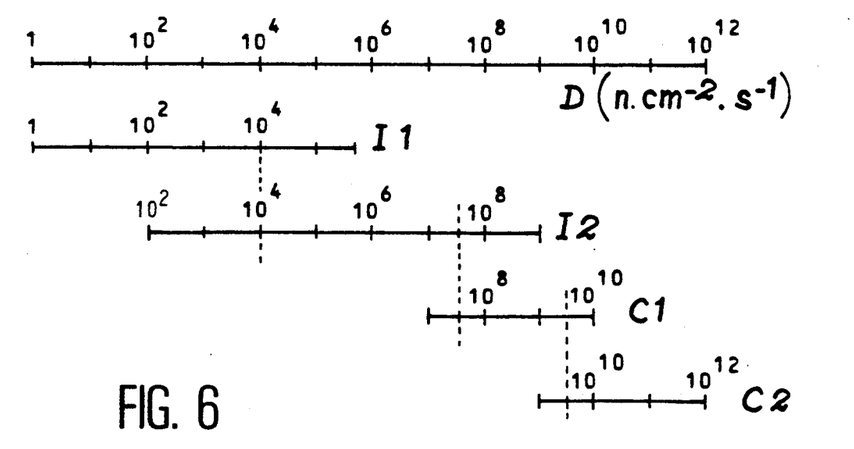
FIG. 6 graphically the operating range of the apparatus shown in FIG. 5.

In can be seen in FIG. 6 that, for covering the neutron flux density range D from 1 to $10^{12}$ neutrons·cm$^{-2}$·s$^{-1}$ with the apparatus shown in FIG. 5, working takes place in the pulse mode using the first electrode group (I1) from 1 to $10^4$ neutrons·cm$^{-2}$·s$^{-1}$ (with the possibility of extending to $10^5$ neutrons·cm$^{-2}$·s$^{-1}$)

pulse mode using the second electrode group (I2) from $10^4$ to $5\times 10^7$ neutrons·cm$^{-2}$·s$^{-1}$ (with the possibility of extending to $10^8$ neutrons·cm$^{-2}$·s$^{-1}$), current mode using the first electrode group (C1) from $5\times 10^7$ to $5\times 10^9$ neutrons·cm$^{-2}$·s$^{-1}$ (with the possibility of extending to $10^{10}$ neutrons·cm$^{-2}$·s$^{-1}$) and current mode using the second electrode group (C2) from $5\times 10^9$ to $10^{12}$ neutrons·cm$^{-2}$·s$^{-1}$).

The interelectrode space can be identical for both electrode groups, but can also differ.

Generally, the electrodes of the second group will be closer together than those of the first group in order to improve the neutron I/gamma I ratio.

We claim:

1. Fission chamber with a wide measuring range comprising an enclosure (2) filled with a gaseous medium and, in the said enclosure, a plurality of electrodes covered with a fissile material, said chamber being characterized in that the electrodes are distributed into two groups comprising:

a first group of electrodes (8-10, 8-10-30-32) adjacent to the periphery of the enclosure, at least one electrode (8,8-30-32) of said first group being covered with a first deposit (14) of fissile material having a first surface density and a second group of electrodes (10-12, 10-12-34) adjacent the centre of the enclosure and therefore exposed to a lower neutron flux density than that to which are exposed the electrodes of the first group, at least one electrode (12) of the second group being covered with a second deposit (18) of fissile material having a second surface density that is less than that of the first deposit (14) and chosen in such a way as to make as large as possible the ratio of the currents respectively due to neutrons and spurious gamma radiation detected via the electrodes of the second group and to optimize the linearity of the signal supplied by the electrodes (10-12,10-12-34) of said second group for a given neutron flux density range.

2. Chamber according to claim 1, characterized in that the surface density of the first fissile material deposit (14) is between 1 and 2 mg·cm$^{-2}$.

3. Chamber according to claim 1, characterized in that the surface density of the second fissile material deposit (18) is between 0.01 and 1 mg·cm$^{-2}$.

4. Chamber according to claim 3, characterized in that the surface density of the second fissile material deposit (18) is between 0.1 and 1 mg·cm$^{-2}$.

5. Chamber according to claim 1, characterized in that each electrode group has two electrodes (8-10, 10-12), whereof one of said two electrode (10) is grounded and is common to both groups.

6. Chamber according to claim 1, characterized in that the first electrode group has at least three parallel-connected electrodes (8,10,30,32).

7. Chamber according to claim 1, characterized in that the second electrode group has at least two parallel-connected electrodes (12,34).

8. Chamber according to claim 1, characterized in that the electrodes of the first and second groups are cylindrical and coaxial.

9. Chamber according to claim 1, characterized in that the electrodes of the first and second groups are supported at each end by electrically insulating supports (4,5).

10. Chamber according to claim 1, characterized in that it also has interelectrode guard rings (22,24,26,28).

11. Apparatus for measuring the neutron flux density comprising a fission chamber (6), means (38,45,46,52) for biasing the electrodes of the chamber and electronic means (40-42-44, 48-50-54-56) for processing electrical signals supplied by said chamber and serving to determine the neutron flux density, characterized in that the fission chamber (6) is in accordance with claim 1.

12. Apparatus according to claim 11, characterized in that the electronic processing means comprise neutron flux density measuring means (40) able to operate in the pulse mode and associated with the first electrode group, neutron flux density measuring means (42) able to operate in the fluctuation mode and associated with the first electrode group and neutron flux density measuring means (44) able to operate in the current mode and associated with the second electrode group.

13. Apparatus according to claim 11, characterized in that the electronic processing means comprise first neutron flux density measuring means (48) able to operate in the pulse mode and associated with the first group of electrodes, second neutron flux density measuring means (56) able to operate in the pulse mode and which are associated with the second group of electrodes and which serve to measure neutron flux densities above those measured with the aid of the first means (48), third neutron flux density measuring means (54) able to operate in the current mode and which are associated with the first group of electrodes and measure neutron flux densities above those measured with the aid of the second means (56) and fourth neutron flux density measuring means (50) able to operate in the current mode and associated with the second group of electrodes and which measure flux densities above those measured with the aid of the third means.

* * * * *

UNITED STATES PATENT AND TRADEMARK OFFICE
CERTIFICATE OF CORRECTION

PATENT NO. : 5,098,639

DATED : March 24, 1992

INVENTOR(S) : Eugene Bacconnet, Gerard Dauphin

It is certified that error appears in the above-identified patent and that said Letters Patent is hereby corrected as shown below:

In Column 5, line 37, delete "vialan" and insert therefor --via an--;

In Column 9, Claim 5, line 30, delete "electrode" and insert therefor --electrodes--.

Signed and Sealed this

Thirty-first Day of August, 1993

Attest:

BRUCE LEHMAN

*Attesting Officer*  *Commissioner of Patents and Trademarks*